United States Patent [19]
Even

[11] Patent Number: 5,905,586
[45] Date of Patent: *May 18, 1999

[54] TWO-WAY OPTICAL FIBER COMMUNICATION SYSTEM HAVING A SINGLE LIGHT SOURCE

[75] Inventor: Reed Kamenetzky Even, Livingston, N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/691,767

[22] Filed: Oct. 31, 1996

[51] Int. Cl.$^6$ ........................................... H04B 10/24
[52] U.S. Cl. ........................... 359/113; 359/152; 359/191
[58] Field of Search ........................... 359/113, 125, 359/127, 132–133, 167–169, 173, 183, 143, 152, 191

[56] References Cited

U.S. PATENT DOCUMENTS 5,267,074  11/1993  Kluitmans et al. ....................... 359/191
5,408,350  4/1995  Perrier et al. ........................... 359/113

OTHER PUBLICATIONS

Frigo et al., "A Wavelength–Division Multiplexed Passive Optical Network With Cost–Shared Components", IEEE Photonics Technology Letters, vol. 6, No. 11, Nov. 1994.

Primary Examiner—Kinfe-Michael Negash

[57] ABSTRACT

A system and method for providing two-way optical communications between a first location and at least one secondary location, wherein there is no light source available at the secondary location. In the system and method, the first location and the secondary locations are optically coupled by an optical fiber network. A laser light source is located at the first location and produces a first light signal that is transmitted to the secondary locations over the optical fiber network. At the secondary locations a portion of the first light signal is altered by selectively modulating the signal frequency. As a result, a second light signal is produced without the need of a second light source. The second light signal is then sent back to the first location over the optical fiber network where it can be isolated and interpreted as a data transmission.

26 Claims, 3 Drawing Sheets

— REFLECTOR DISPLACEMENT
— FREQUENCY DEVIATION

TWO-WAY OPTICAL FIBER COMMUNICATION SYSTEM HAVING A SINGLE LIGHT SOURCE

BACKGROUND OF THE INVENTION

1. Field of the Invention

The present invention relates in general to two-way optical fiber communication systems where data can be exchanged between a central location and at least one remote location. More particularly, the present invention relates to two-way optical fiber communication systems that use only a single laser light source to establish the two-way communications between the central location and at least one remote location.

2. Description of the Prior Art

There are many applications that utilize an optical fiber network to establish two-way optical communications between a host digital terminal (HDT) at a central location and an optical network unit (ONU) at a remote location. Typically, communications from the HDT to the ONU are considered downstream communications, while communications from the ONU to the HDT are considered upstream communications. An example of such a two way optical communication would be a television cable supplier that offers a pay-per-view movie service via an optical fiber network. The cable supplier may list the movies available over the optical fiber network. The customers, via their cable boxes, may then interact with the cable supplier over the optical fiber network to select a particular movie.

At present, two-way optical communications between two locations requires that each location use its own light source for generating the optical carrier that carries the information to be transmitted. Light sources are expensive, making such optical communication systems economically impractical for many applications.

N. J. Frigo et al. have proposed in a paper entitled "RITE-Net: A Passive Optical Network Architecture Based On The Remote Interrogation of Terminal Equipment", OFC'94, San Jose, Calif., Paper No. KD8, pp.43–45, and in a paper entitled "Wavelength-Division Multiplexed Passive Optical Network with Cost-Shared Components", IEEE Photonic Technology Letters, Vol. 6, pp. 1365–1367, 1994, an optically-passive access system. The disclosure of these papers has the HDT at a central location connected to a remote location by two optical fibers. However, in the disclosed systems only the HDT has a light source, which it uses to transmit a signal to a remote location on one of the fibers. The remote location reflects some of the light it receives to the second fiber, whereby the second fiber carries the second signal back to the HDT. The modulation used in both directions of transmission is identical, in that the absence of light stands for one of the two binary symbols used (1 or 0) and the presence of light indicates the second binary symbol (0 or 1). Because of the identical modulation, reflections result in significant interference, thereby imposing constraints on system design.

Nevertheless, such prior art systems are attractive in that they have the potential of reducing costs and can be used in different system configurations that allow sharing of some of the fiber between the HDT and the remote locations.

One way of reducing system costs is to use a single fiber for both directions of transmission. This implies a need for a transmission plan in which upstream reception is insensitive to reflections of the downstream signal by using different modulation schemes in the two directions of transmission.

SUMMARY OF THE INVENTION

The present invention is a system and method for providing two-way optical communications between a central location and at least one remote location, wherein the remote location does not have a light source. In the system and method, the central location is connected to the remote locations by an optical fiber network which consists of a single fiber between the central location and a splitter/router at some Remote Node (RN). The RN is connected by one fiber to each of the remote locations. The splitter/router routes the appropriate downstream signal to each remote location and combines the upstream signals from the remote locations into one upstream signal. The light from the source at the central location is amplitude-modulated by the signal to be transmitted to the remote location. At the remote location, the light signal is split, wherein some of the light signal is directed to the receiver and some of it is diverted to a modulator. The modulator is used to modulate the frequency of the light and produce the signal to be transmitted upstream, whereby the light is sent back to the central location on the same fiber. The received upstream signal is demodulated coherently at the central location, where the unmodulated light of the laser source serves as the local oscillator.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention optical communication system can be used in most any application where data is to be transmitted to and received from at least two locations, the present invention optical communication system is particularly well suited for applications between a single central location and a plurality of remote locations that are coupled to the central location via a fiber optic network. Consequently, by way of example, the present invention optical communication system will be described in an application where a fiber optic network joins multiple remote locations to a single central location.

Figure 1:
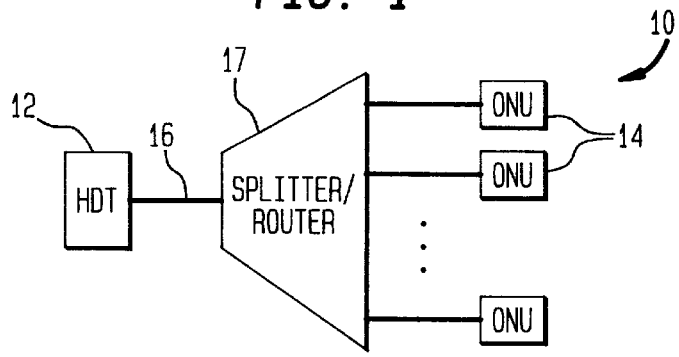
FIG. 1 is a general block diagram schematic of one embodiment of a two-way optical communication system in accordance with the present invention.

Referring to FIG. 1, an exemplary optical communication system 10 is shown in accordance with the present invention. The optical communication system 10 includes a Host Digital Terminal (HDT) 12 and a plurality of Optical Network Units (ONUs) 14 that are coupled to the HDT 12 by a fiber optic network 16. The HDT 12 is co-located with a service node, which can be a central office run by a local exchange carrier, a local PBX, an Internet access gateway, or any other vehicle for delivering digital services. Each ONU 14 is located on or near the end user's premises. The fiber optic network 16 uses a single fiber between the HDT and a splitter/router 17. A single fiber is also used between the splitter/router 17 and each ONU 14. Although the exemplary fiber optic network of FIG. 1 shows an HDT coupled to each one of the ONUs through a single splitter/router, it would be understood by a person skilled in the art that the fiber optic network may be configured in any suitable arrangement such that the HDT may serve multiple ONUs.

Figure 2:
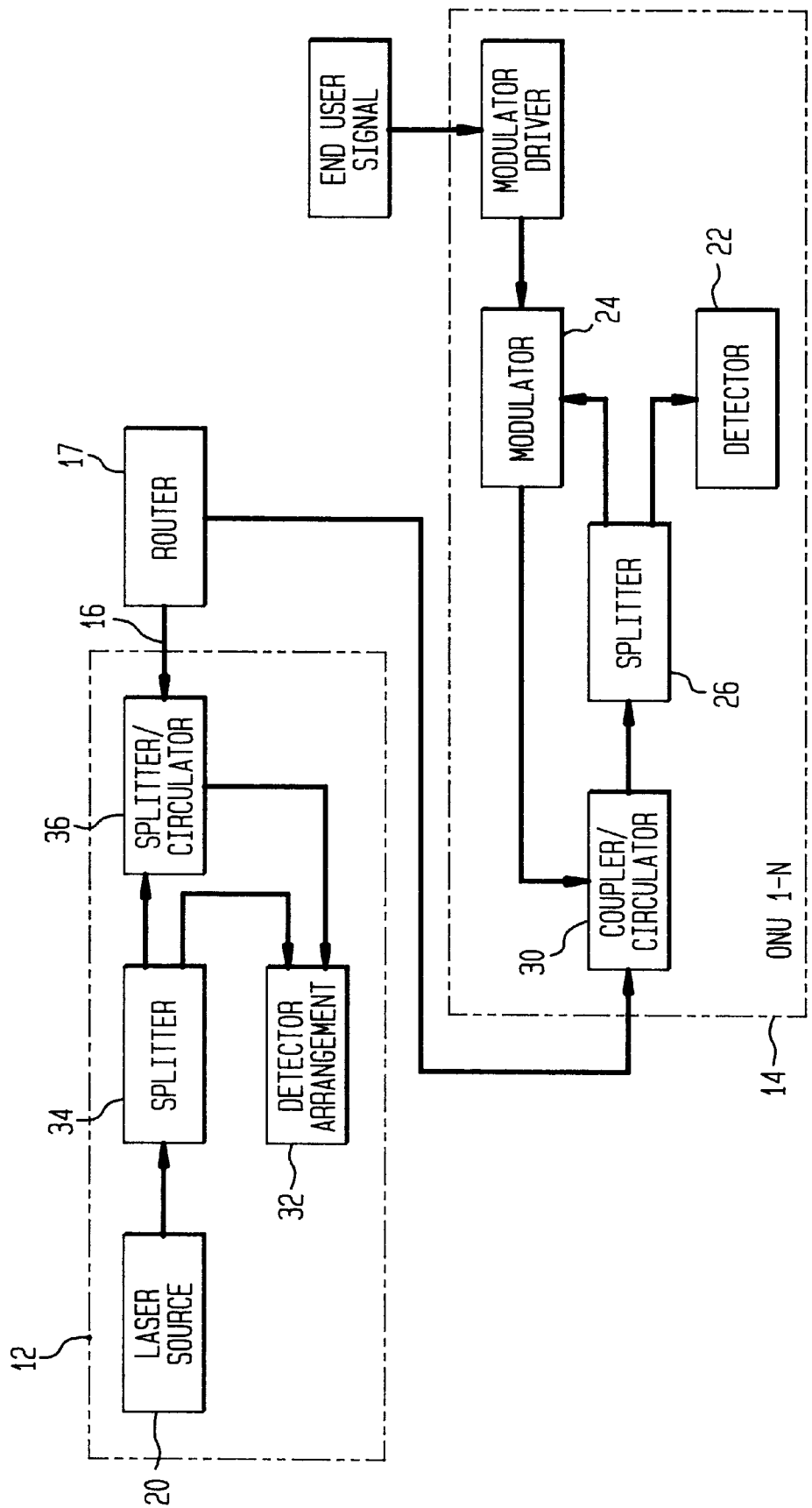
FIG. 2 is a detailed block diagram schematic of the two-way optical communication system of FIG. 1.

Referring to FIG. 2, it can be seen that the HDT 12 contains a laser light source 20. The laser light source 20 is modulated to produce a digital data stream that is carried to the various ONUs 14 from the HDT 12. In the shown embodiment, light from the laser light source 20 is power-split to all the ONUs 14 that subtend at the same fiber 16. At each ONU 14, there is an optical detector 22 for detecting the light signal sent to the ONU 14 from the HDT 12. As such, a traditional one-way transmission link is provided from the HDT 12 to each ONU 14, wherein the HDT 12 creates an optical signal and the ONUs 14 detect the optical signal, via the fiber optic network 16.

In the embodiment of FIG. 2, the light signal received at the ONU 14 passes through a coupler/circulator 30 that is coupled to a splitter 26. Some of the light is directed to a detector 22 and the rest of the light passes through a phase modulator 24 on its way back to the HDT 12 through the coupler/circulator 30. The coupler/circulator 30 and the splitter 26 act as a reflector in this embodiment, where at least a portion of the incoming light signal is first directed into the modulator 24 and is then directed back through the fiber optic network 16.

The phase modulator is preferably a lithium-niobate (LiNbO$_3$) or a III-V semiconductor device that modulates the phase of the light that passes through it, thereby varying the apparent length of the path traversed by the light. Thus, phase variations are perceived by an external observer as changes in the position of the reflector. Such phase modulators are available commercially and need not be described in detail here.

Figure 4:
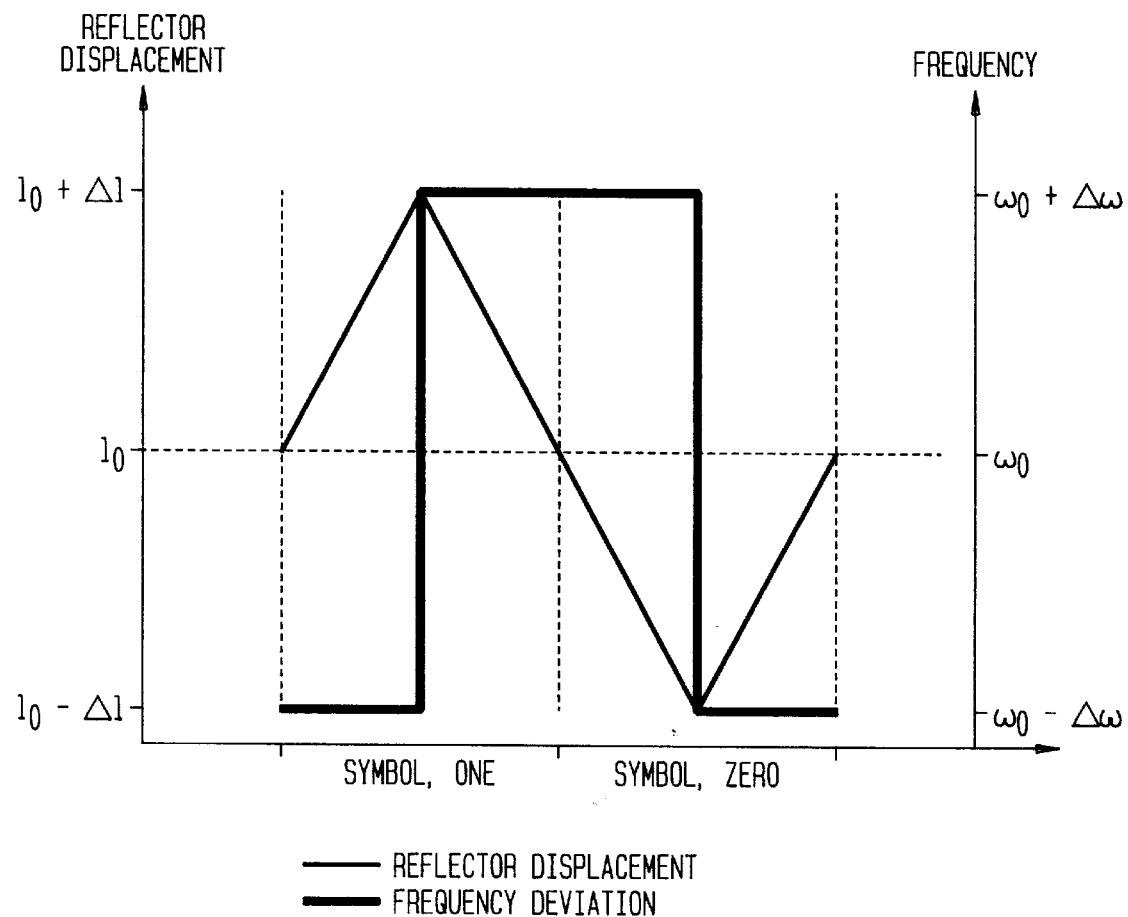
FIG. 4 is a graph plotting reflector displacement vs. frequency deviation for a modulator that provides a perception of a reflective surface with a constant-speed motion, wherein said modulator can be applied to any one embodiment of the present invention optical communication system.

The phase is modulated according to the binary signal to be transmitted to the HDT 12 so as to create a perceived reflector motion that is linear with time, such as that shown in FIG. 4. This results in a perception of a constant-speed motion of a reflector from or towards the observer, which generates by the Doppler effect a fixed respective downward or upward shift in the frequency of the transmitted signal. In the possible modulation scheme shown in FIG. 4, one of the two binary symbols is encoded as a decrease followed by an increase in the frequency, while the other is encoded as an increase followed by a decrease in frequency. From the exemplary configuration, frequency shifts on the order of 30 MHz for bit rates of 20 Mb/s are readily attainable.

In FIG. 2 it can be seen that a balanced detector arrangement 32 is located at the HDT 12 for the purpose of detecting the upstream signal from the ONUs 14. A first splitter 34 is provided that directs a portion of the original optical signal emitted from the HDT 12 toward the balanced detector arrangement 32. A splitter/circulator 36 is provided that directs the return transmission from the ONUs 14 to the received signal input of the balanced detector arrangement 32. Using the light from the laser light source 20 as its local oscillator input, the detector arrangement 32 decodes the signals received from the ONUs 14, thereby establishing an upstream communications path. As such, a return transmission link is established between the ONUs 14 and the HDT 12.

In the exemplary embodiment of FIG. 2, an electro-optical phase modulator 24 is used to modulate the laser light originating at the HDT 12 in order to produce a return signal without need of a secondary laser light source. However, it should be understood that the use of such a modulator is only exemplary and other modulator configurations can also be used. For example, the modulator can be configured to include a reflective or semi-reflective surface perpendicular to the optical axis of a fiber optic so that light emitted from an optical fiber bundle can be at least partially reflected back into the optical fiber bundle. Modulation of the reflected light can be achieved by mechanically moving the reflective or semi-reflective surface either toward or away from the optical fiber bundle. Due to the Doppler effect, as the reflective or semi-reflective surface moves toward or away from the optical fiber bundle, the frequency of the reflected light would either increase or decrease. In accordance with the Doppler effect, the frequency of the light reflected from a moving reflector is given by $$\omega = \omega_0 \sqrt{\frac{c \mp v}{c \pm v}} \quad \text{[Equation 1]}$$

where $\omega$ is the frequency of the reflected light, $\omega_0$ is the frequency of the incident light, c is the speed of light and v is the velocity at which the reflective or semi-reflective surface moves. The upper signs, "-" in the numerator and "+" in the denominator, apply when the reflective or semi-reflective surface moves away from the optical fiber bundle. The lower signs, "+" in the numerator and "-" in the denominator apply when the reflective or semi-reflective surface moves towards the optical fiber bundle.

Figure 3:
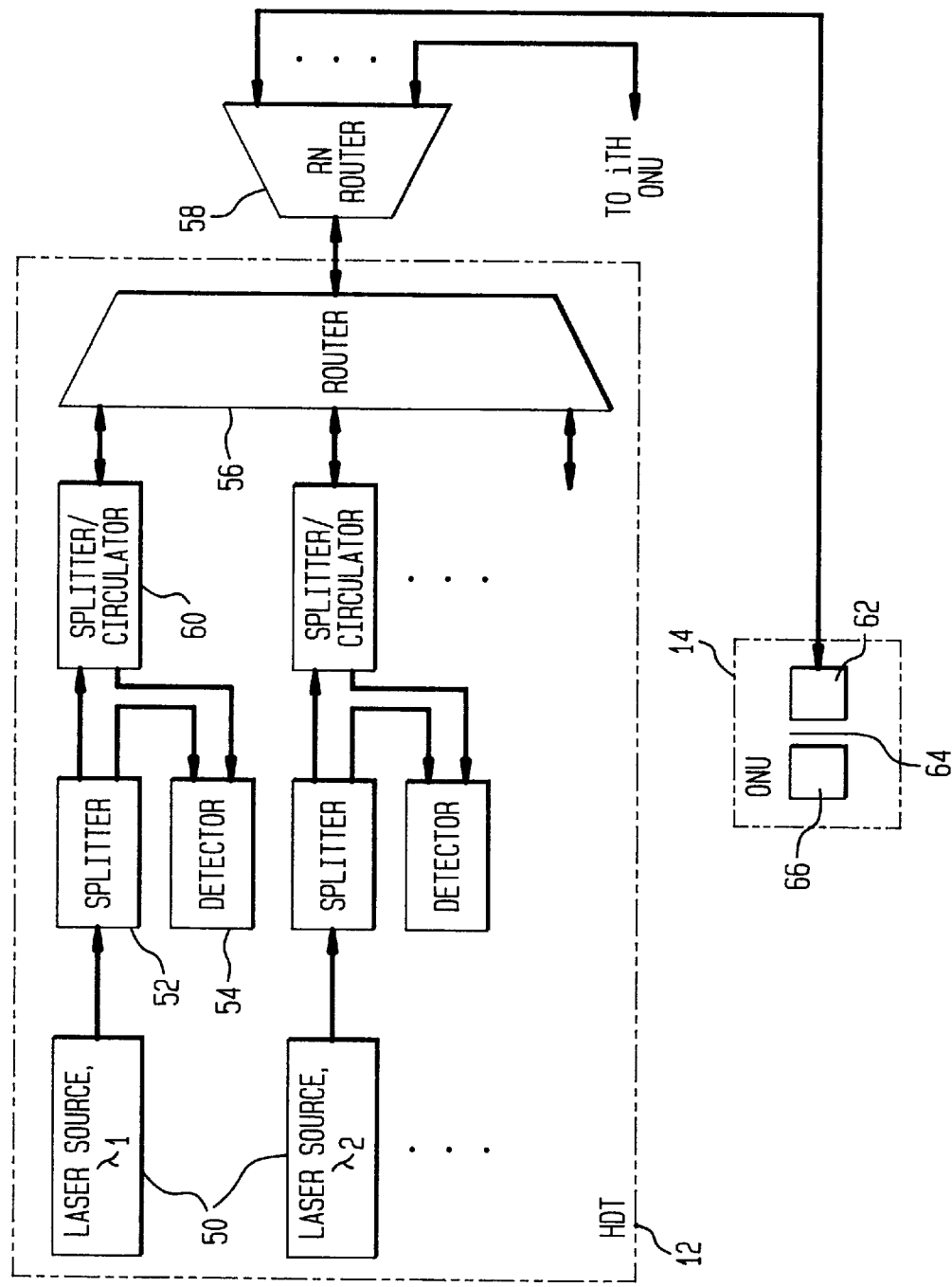
FIG. 3 is a detailed block diagram schematic of an alternate embodiment of a two-way optical communication system in accordance with the present invention.

Referring to FIG. 3, an alternate exemplary embodiment of the present invention system is shown. In this embodiment, the HDT 12 contains some number (N) of laser light sources 50. Each laser light source 50 emits light at a different wavelength ($\lambda_i$), within the same wavelength window. The light from the i-th laser light source is modulated by the signal intended for the i-th ONU. Some of the light is diverted by a splitter 52 to the local oscillator input of the coherent detector arrangement 54. The N modulated light signals are combined by a router 56 onto a single fiber which leads to the remote node router 58. At the remote node router 58, the laser light signals are routed to the ONUs 14 based upon their wavelength.

The light signal that is returned from each ONU 14 is directed by the router 56 to the corresponding detector arrangement 54, based upon its wavelength. The returning light signal is passed through a splitter/circulator 60 and is received at the signal input of the detector arrangement 54.

At each ONU 14, the light signal received passes through a phase modulator 62 and impinges upon a semi-reflective, semi-transmissive surface 64. Some of the light passes through the semi-reflective, semi-transmissive surface 64 and is received by a detector 66. The remaining light is reflected back and again passes through the phase modulator 62 on its way back to the HDT 12. The phase modulator 62 is preferably the same as that described in accordance with FIG. 2.

Referring to FIG. 4, it can be seen that by modulating a light signal at an ONU, an antipodally or exactly opposite modulated binary signal can be obtained that can be returned to the HDT. The modulation results in a perception of a constant-speed motion of a reflector from or towards the observer, which generates a fixed respective downward or upward shift in the frequency of the transmitted signal. The perceived time-linear motion of a reflector can modulate an incoming signal and selectively transmit a binary signal (1's and 0's) in return. From FIG. 4, it is shown that both 1's and 0's are conveyed by two frequency deviations, wherein the two binary signals are distinguished by the sequence of the frequency deviations. One binary signal is transmitted by a down-up sequence and the other is transmitted by an up-down sequence. As such, it will be understood that each ONU will transmit antipodal signals. In a preferred embodiment, the HDT uses homodyne optical detection, wherein a detector compares the frequency of the received signal with that of a local oscillator, which is the carrier of the downstream signal. As such, the detector detects the frequency deviations in the received signal and translate the up-down, down-up sequences into the corresponding binary symbols. Such a configuration is insensitive to reflections of the on-off signals of the HDT, thereby increasing the loss budget in the upstream direction and enabling a one-fiber implementation of the signal.

It will be understood that the embodiments of the present invention specifically shown and described are merely exemplary and that a person skilled in the art can make alternate embodiments using different configurations and functionally equivalent components. All such alternate embodiments are intended to be included in the scope of this invention as set forth in the following claims.

What is claimed is:

1. A system-for providing two-way communications between a first location and at least one second location utilizing a single light source at only one location, said two-way communications taking place over an optical fiber network coupling said first location to said at least one second location, said system comprising:
   a light source at said first location for creating a first light signal;
   a first detector located at said at least one second location for detecting said first light signal, via said optical fiber network;
   a modulator disposed at said at least one second location for frequency modulating at least a portion of said first light signal by Doppler effect, thereby creating a second light signal, wherein said second light signal is redirected to said first location, via said optical fiber network; and
   a balanced detector arrangement located at said first location, wherein said balanced detector arrangement receives said first light signal from said light source, receives said second light signal from said modulator and utilizes said first light signal as a local oscillator to decode said second light signal and coherently detect a pattern of frequency deviations in said second light signal caused by said modulator.

2. The system according to claim 1, wherein said at least one second location is configured to contain a plurality of second locations.

3. The system according to claim 1, wherein said modulator includes an electro-optical phase modulator.

4. The system according to claim 1, wherein said modulator includes a moveable reflective surface.

5. The system according to claim 1, wherein said modulator includes an electro-optical phase modulator and a semi-reflective surface located proximate said electro-optical phase modulator that reflects at least a portion of said second light signal back through said electro-optical phase modulator and back into said optical fiber network.

6. The system according to claim 1, wherein said first light signal and each said second light signal travel within a common optical fiber in said optical fiber network.

7. The system according to claim 1, wherein said light source is a laser.

8. The system according to claim 1, wherein said pattern of frequency deviations in said second signal is representative of a binary signal to be transmitted to said first location from said modulator.

9. A system for providing two-way communications between two locations utilizing a single light signal source, said system comprising:
   a fiber optic connection extending between said locations;
   a light signal source at one of said locations, wherein said light signal source is optically coupled to said fiber optic connection and sends a light signal to the other of said locations;
   a modulator at the other of said locations, wherein said modulator frequency modulates said light signal by Doppler effect to produce a return signal that is sent back through said fiber optic connection
   a balanced detector arrangement optically coupled to said light signal source and said modulator, wherein said balanced detector arrangement receives said light signal from said light source, receives said return signal from said modulator and utilizes said light signal as a local oscillator to decode said return signal and coherently detect a pattern of frequency deviations in said return signal caused by said modulator.

10. The system according to claim 9, wherein said modulator includes an electro-optical phase modulator.

11. The system according to claim 9, wherein said modulator includes a moveable reflective surface.

12. The system according to claim 9, wherein said modulator includes an electro-optical phase modulator and a semi-reflective surface located proximate said electro-optical phase modulator that reflects at least a portion of said second light signal back through said electro-optical phase modulator and back into said fiber optic connection.

13. The system according to claim 9, wherein said pattern of frequency deviations corresponds to a binary signal to be sent back through said fiber optic connection from said modulator.

14. A method of providing a two-way data link between a first location and at least one second location utilizing a single light signal source, said method comprising the steps of:
   producing a first light signal at said first location;
   transmitting said first light signal to said at least one second location;
   producing a second light signal at said at least one second location by frequency modulating said first light signal using Doppler effect;
   transmitting said second light signal back to said first location; and
   utilizing said first light signal as a local oscillator to decode said second light signal and coherently detect a pattern of frequency deviations in said second light signal caused by modulation.

15. The method according to claim 14, wherein said first location and said at least one second location are connected by a fiber optic network.

16. The method according to claim 14, wherein said step of producing a first light signal includes generating said first light signal from a laser source.

17. The method according to claim 14, wherein said at least one second location is configured to contain a plurality of second locations.

18. The method according to claim 14, wherein said step of producing a second light signal includes reflecting said first light signal off a moving reflective surface.

19. The method according to claim 18, wherein said step of producing a second light signal includes passing said first light signal through an electro-optical phase modulator at least a second time.

20. The method according to claim 14, wherein said step of producing a second light signal includes passing said first light signal through an electro-optical phase modulator and reflecting some of the light signal back through said modulator back toward said first location.

21. The method according to claim 14, wherein said step of producing a second light signal includes selectively changing the frequency of said first light signal by at least 30 MHz.

22. The method according to claim 14, further including the step of transmitting said first light signal and said second light signal, between said first position and said second position, along a common optical fiber.

23. In an optical communications system where a first light signal is produced at a light source at a first location and sent to a second location, via an optical conduit, an apparatus for establishing a communications link between said first location and said second location, comprising:

a first detector located at said at least one second location for detecting said first light signal, via said optical fiber network;

a modulator disposed at said at least one second location for frequency modulating at least a portion of said first light signal by Doppler effect, thereby creating a second light signal, wherein said second light signal is redirected to said first location via said optical fiber network; and a balanced detector arrangement optically coupled to said light source and said modulator, wherein said balanced detector arrangement receives said first light signal from said light source, receives said second light signal from said modulator and utilizes said first light signal as a local oscillator to decode said second light signal and coherently detect a pattern of frequency deviations in said second light signal caused by said modulator.

24. The apparatus according to claim 23, wherein said modulator includes an electro-optical phase modulator for passing through a portion of said first light signal.

25. The apparatus according to claim 23, wherein said modulator includes a moving reflective surface for reflecting a portion of said first light signal.

26. The apparatus according to claim 23, wherein said pattern of frequency deviations is representative of a binary signal to be transmitted to said first location from said modulator.

* * * * *